Dec. 15, 1942.  P. E. PEARSON ET AL  2,305,191
PUNCH PRESS
Filed June 24, 1941  15 Sheets-Sheet 1

INVENTORS
P. E. Pearson
A. A. Trombly
By Mason + Porter
ATTORNEYS

Dec. 15, 1942.    P. E. PEARSON ET AL    2,305,191
PUNCH PRESS
Filed June 24, 1941.    15 Sheets-Sheet 2

FIG. 2.

INVENTORS
Paul E. Pearson
Alexander A. Trombley
Mason & Porter
ATTORNEYS

Dec. 15, 1942. P. E. PEARSON ET AL 2,305,191
PUNCH PRESS
Filed June 24, 1941 15 Sheets-Sheet 3
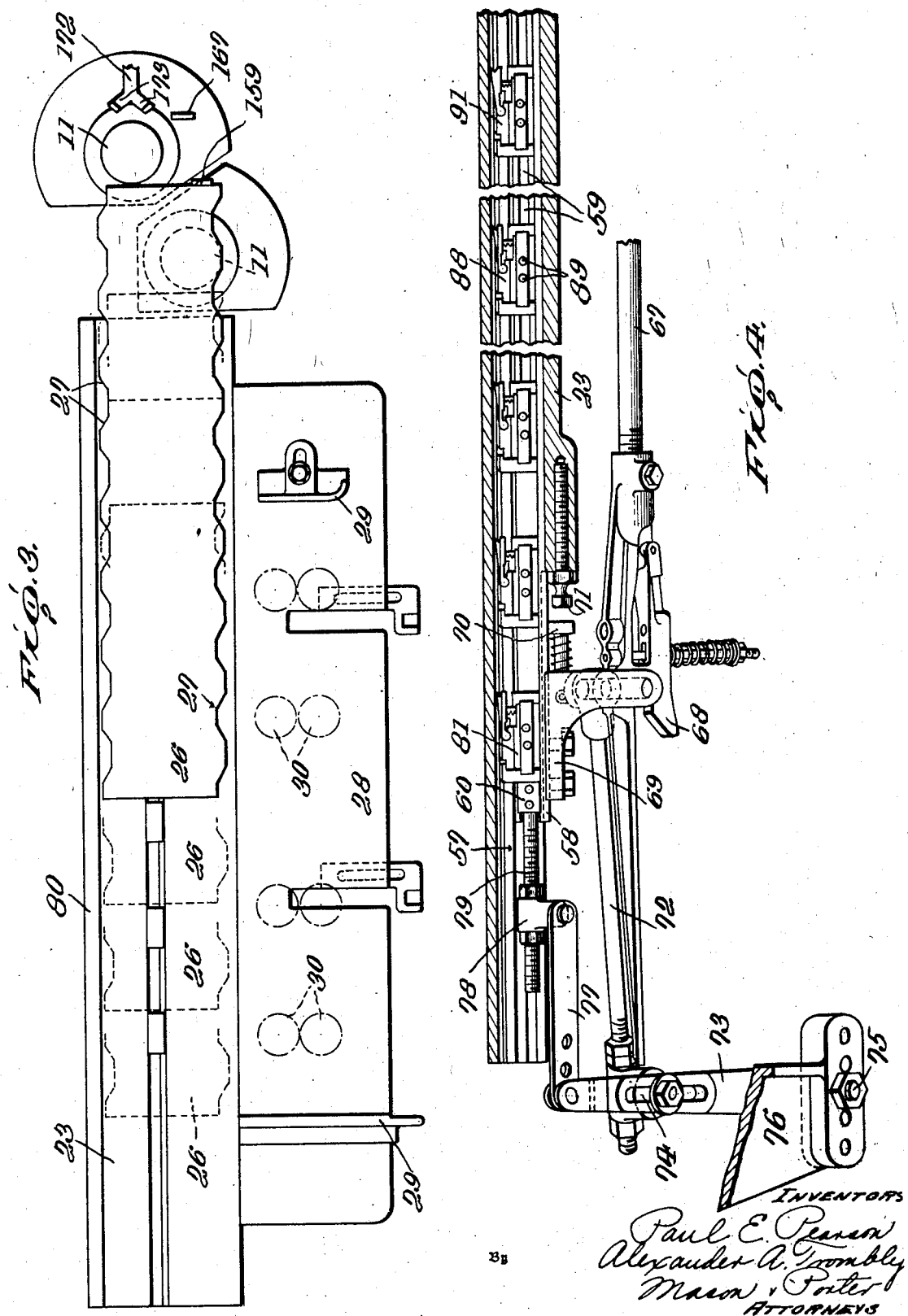

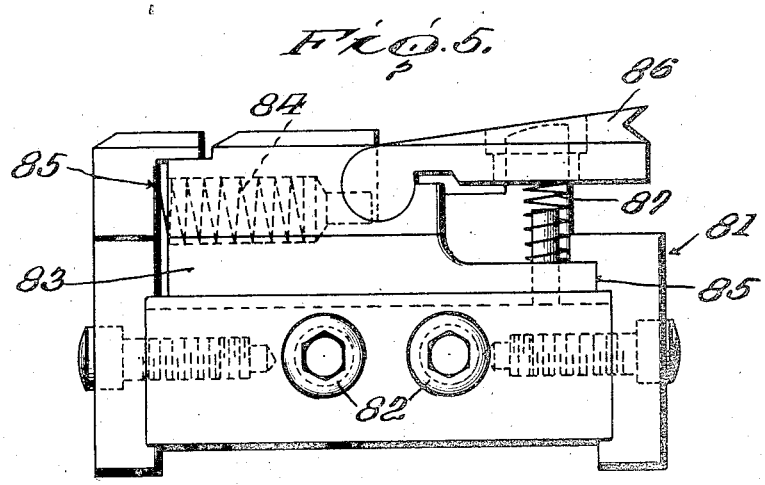
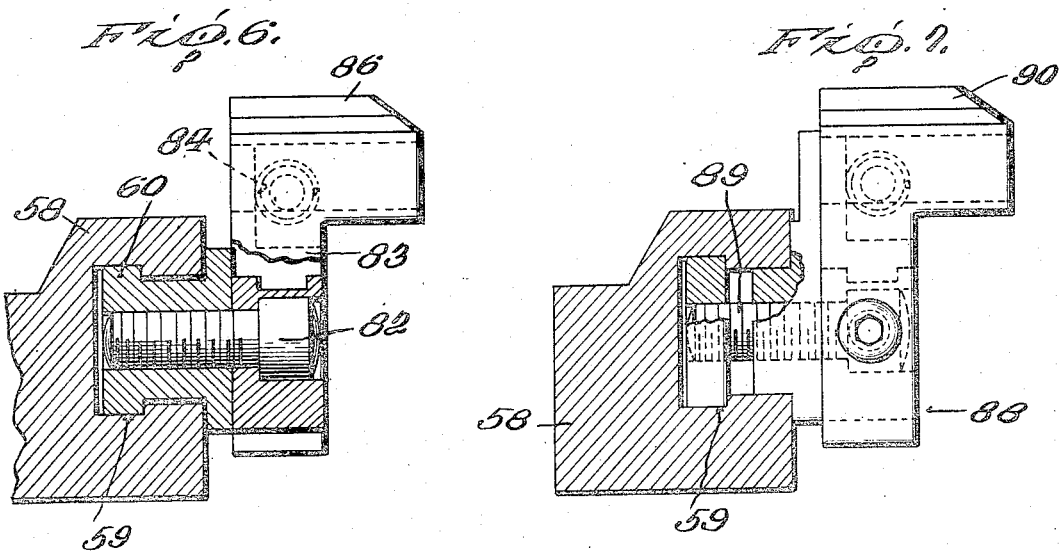
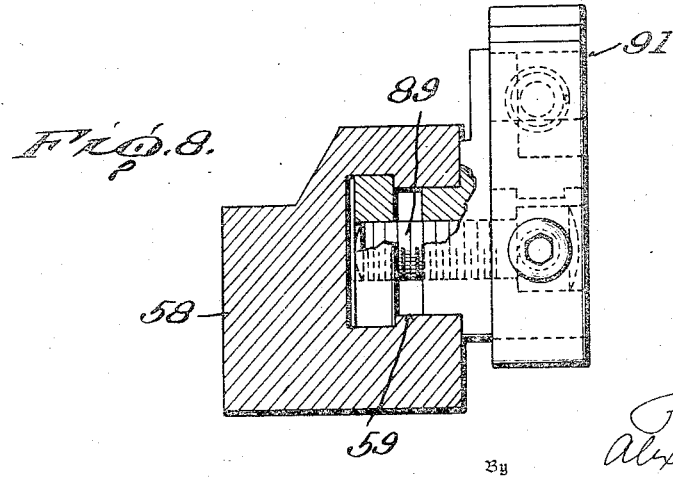

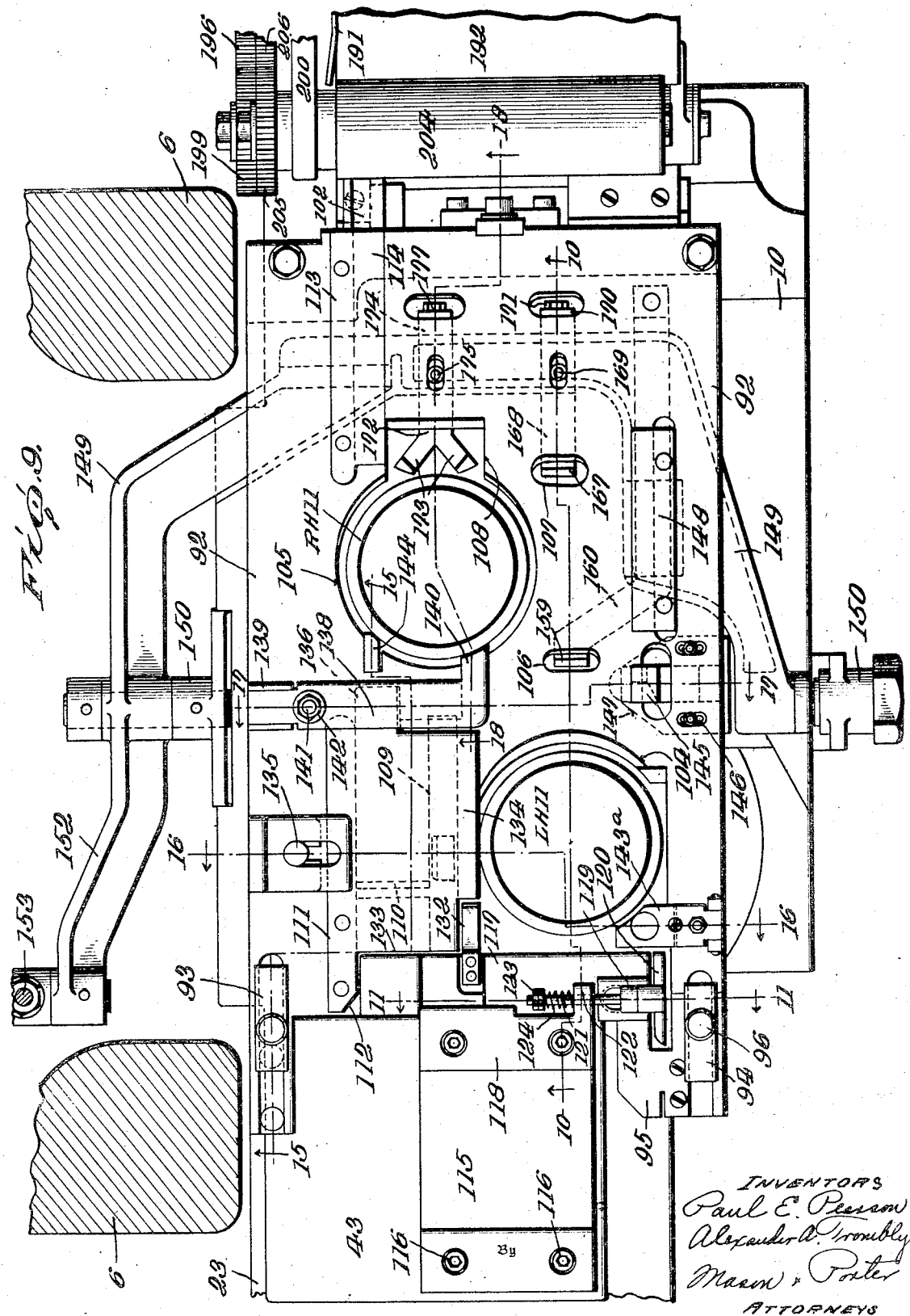

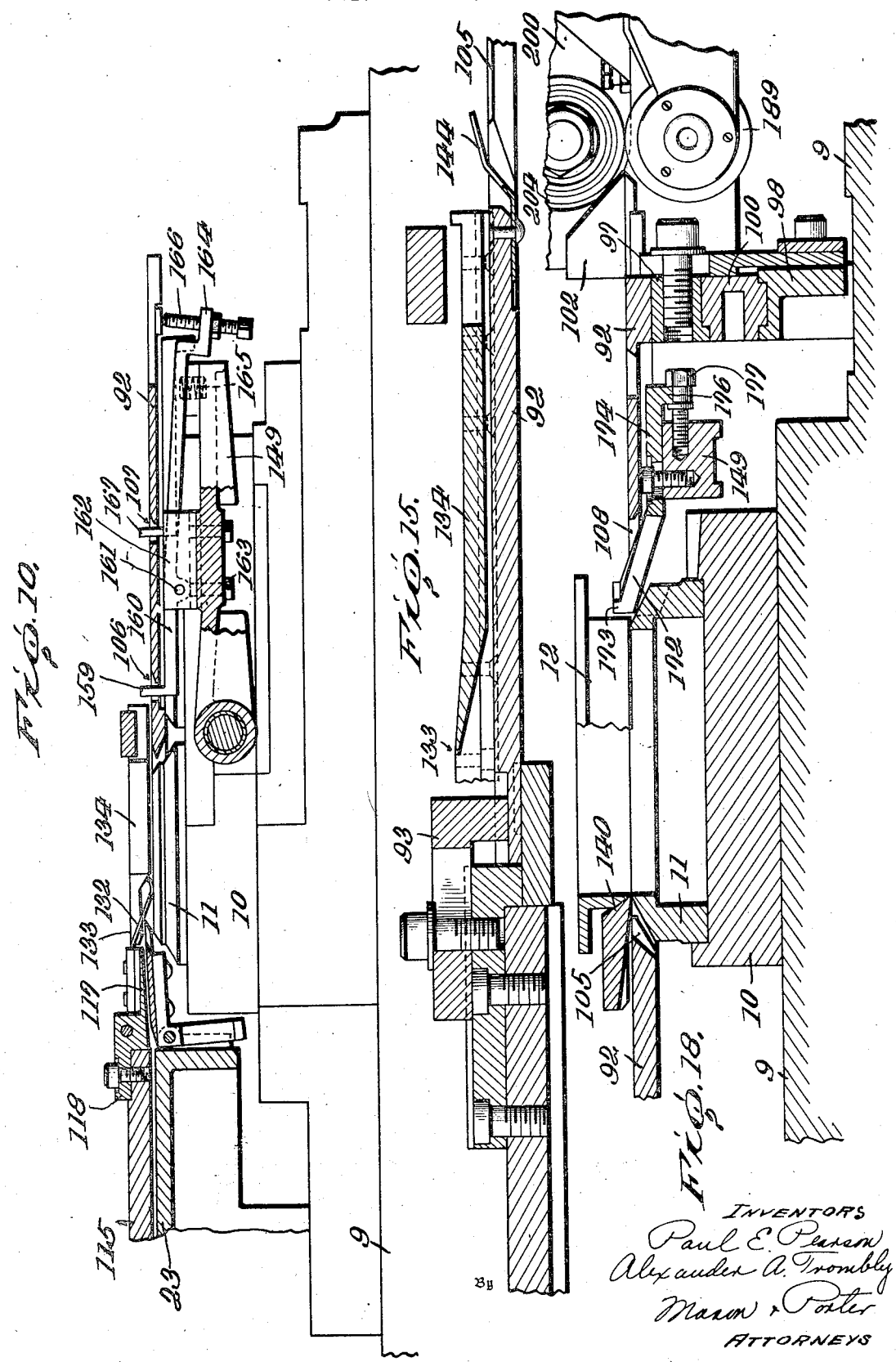

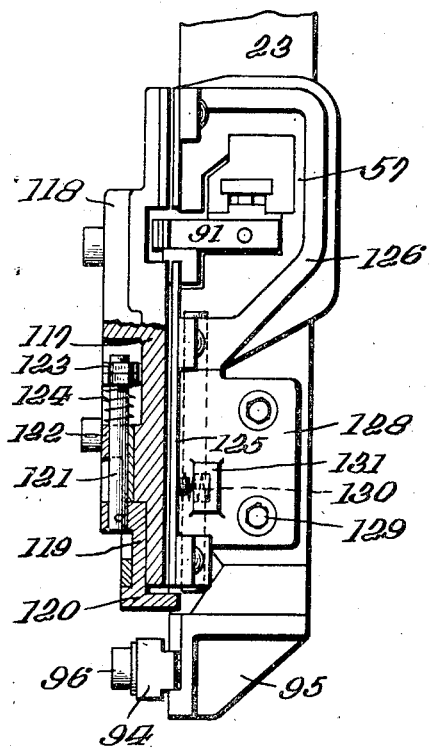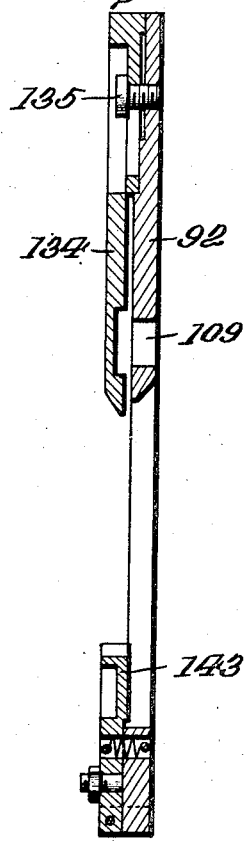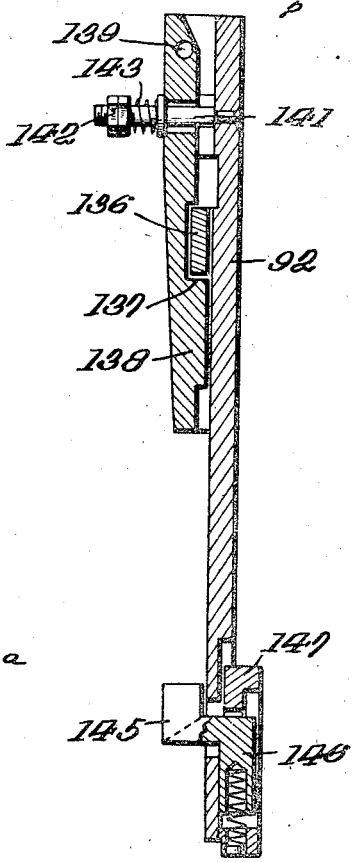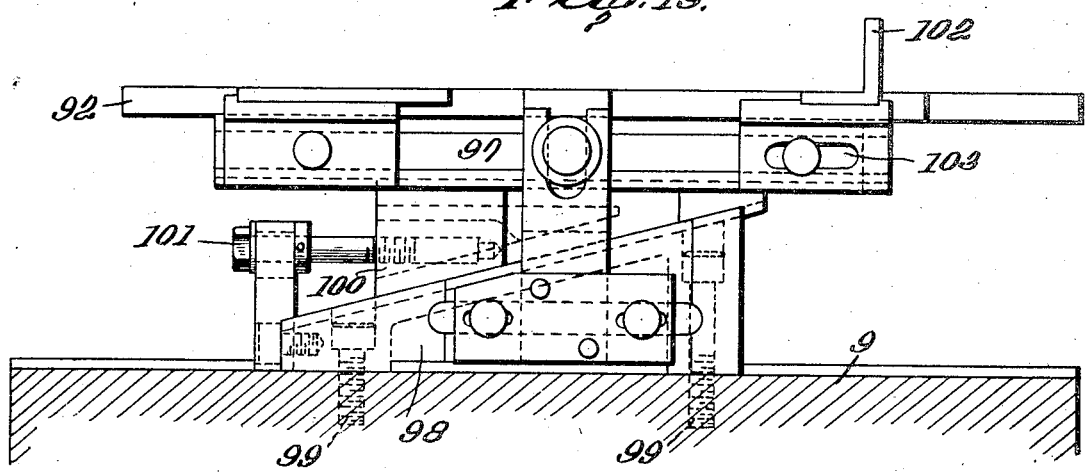

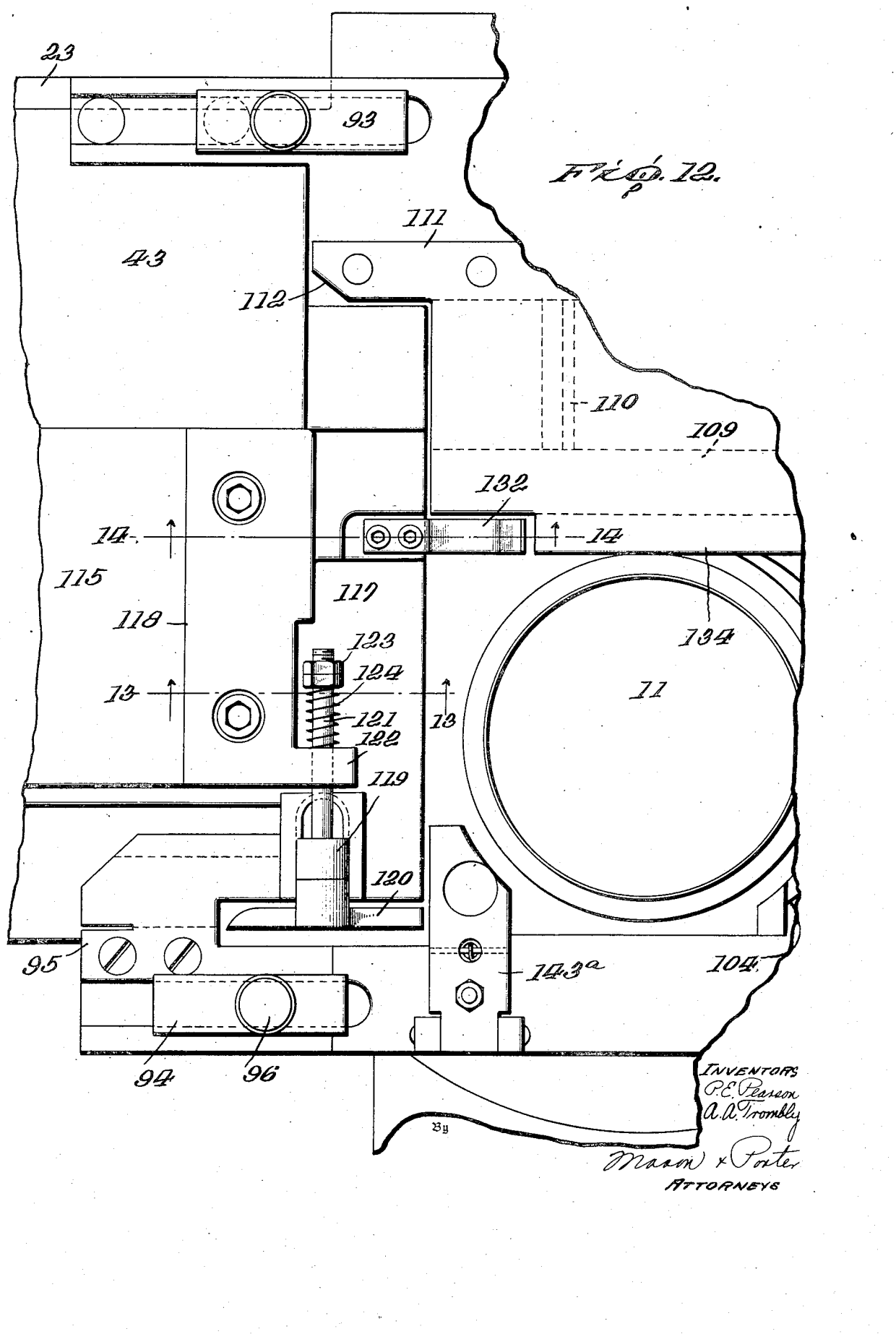

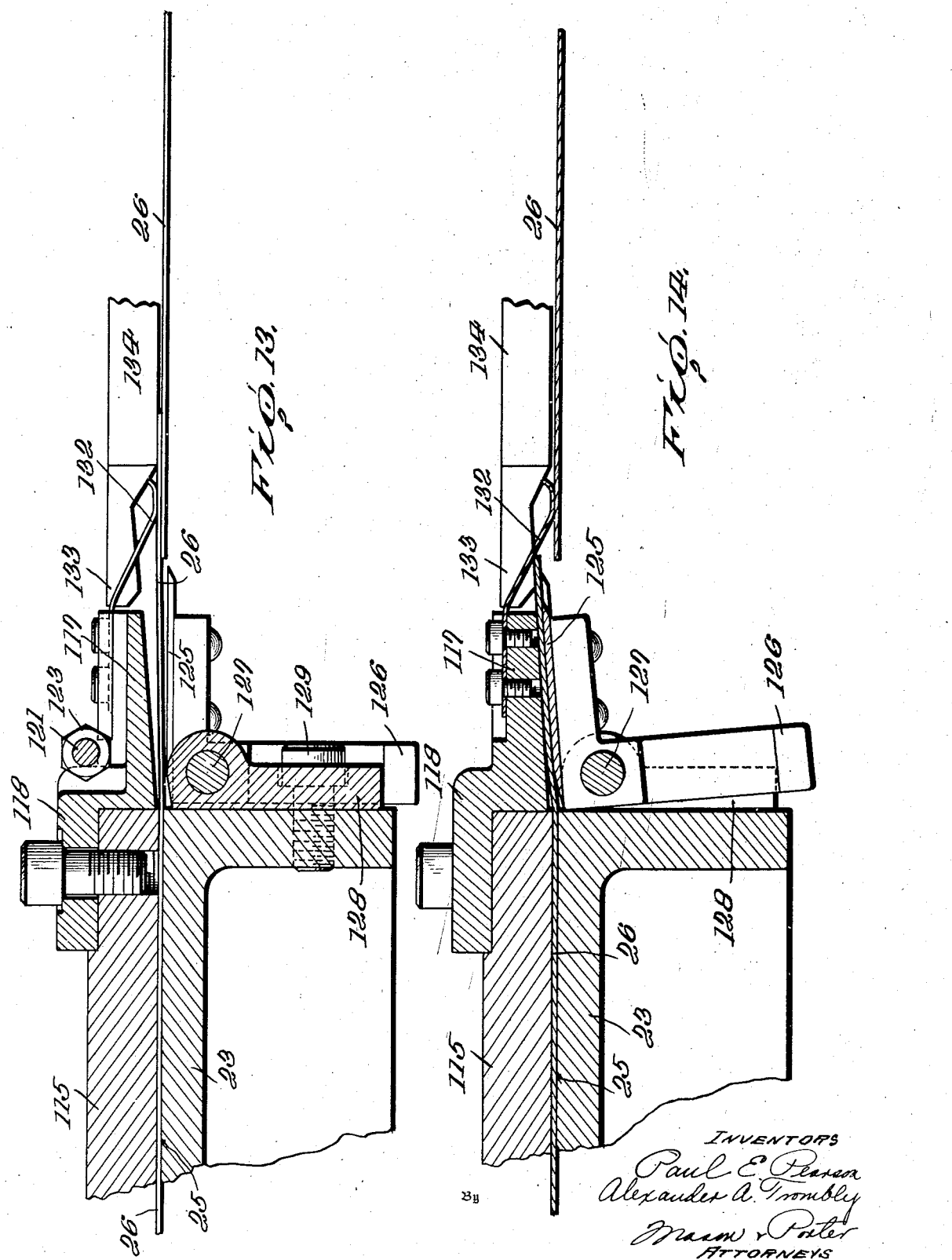

Dec. 15, 1942.   P. E. PEARSON ET AL   2,305,191
PUNCH PRESS
Filed June 24, 1941   15 Sheets-Sheet 10
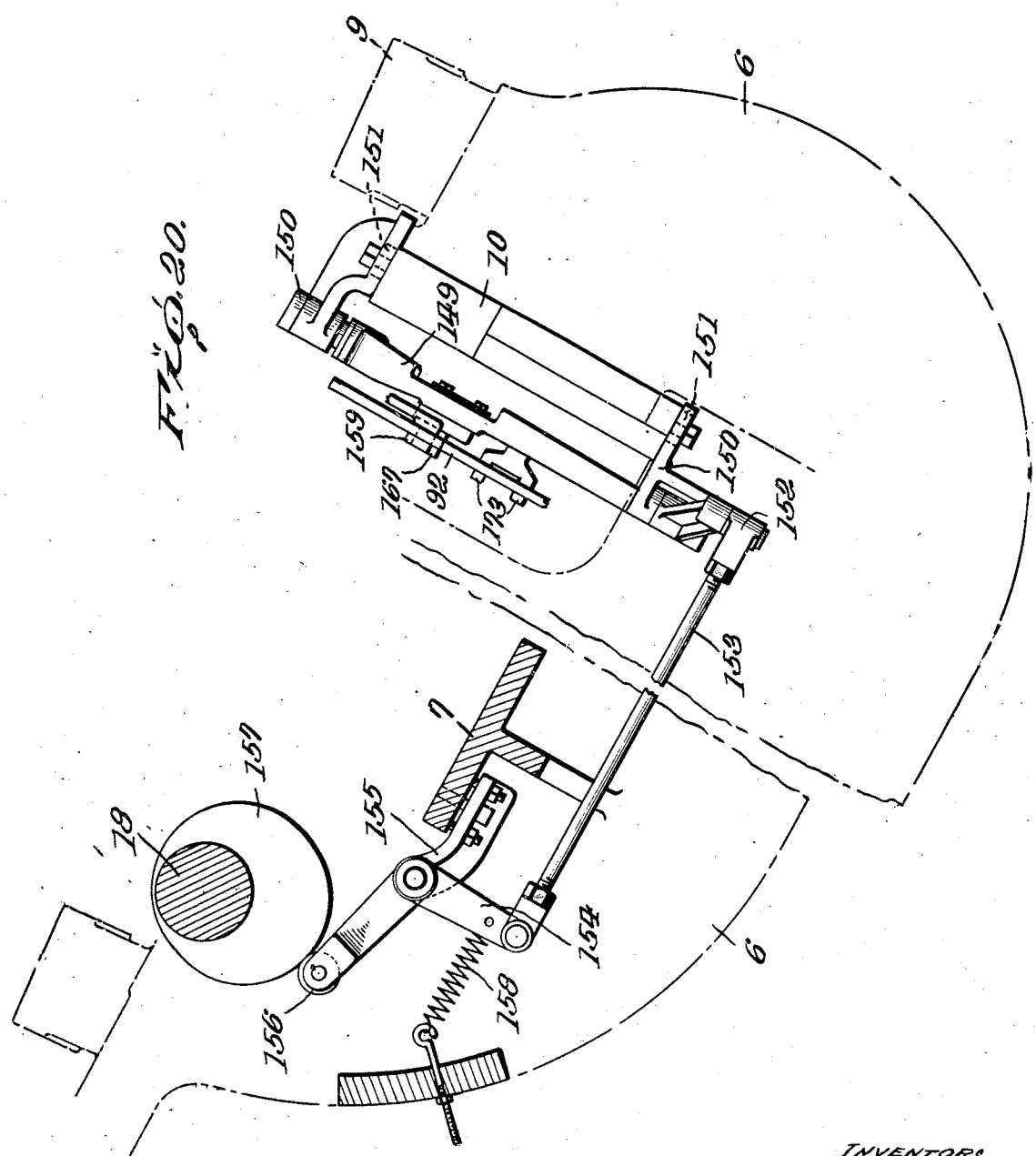

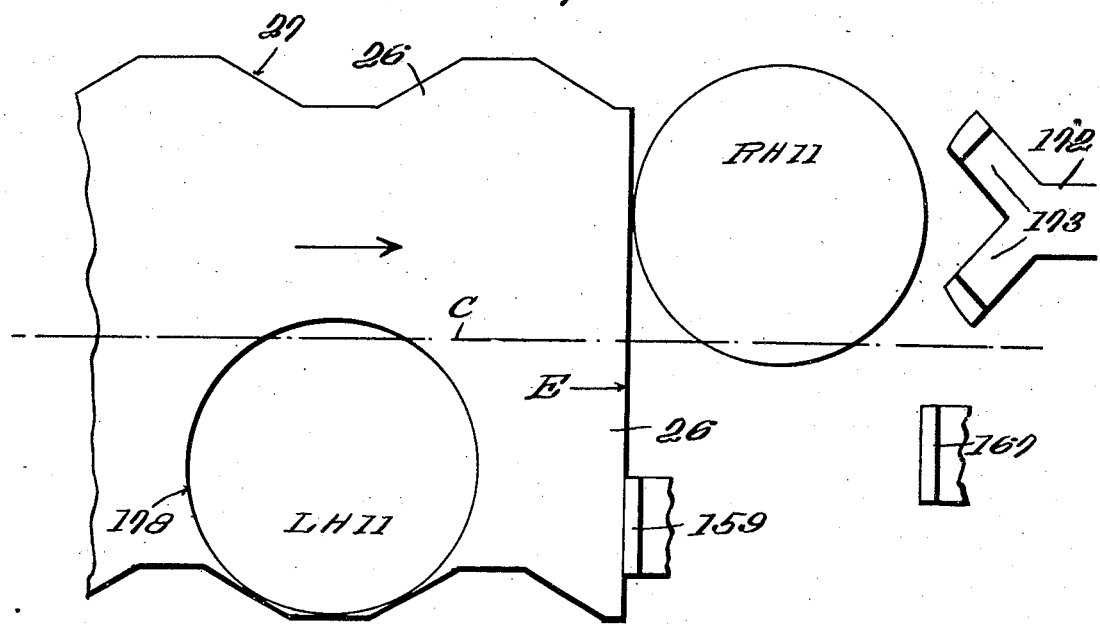
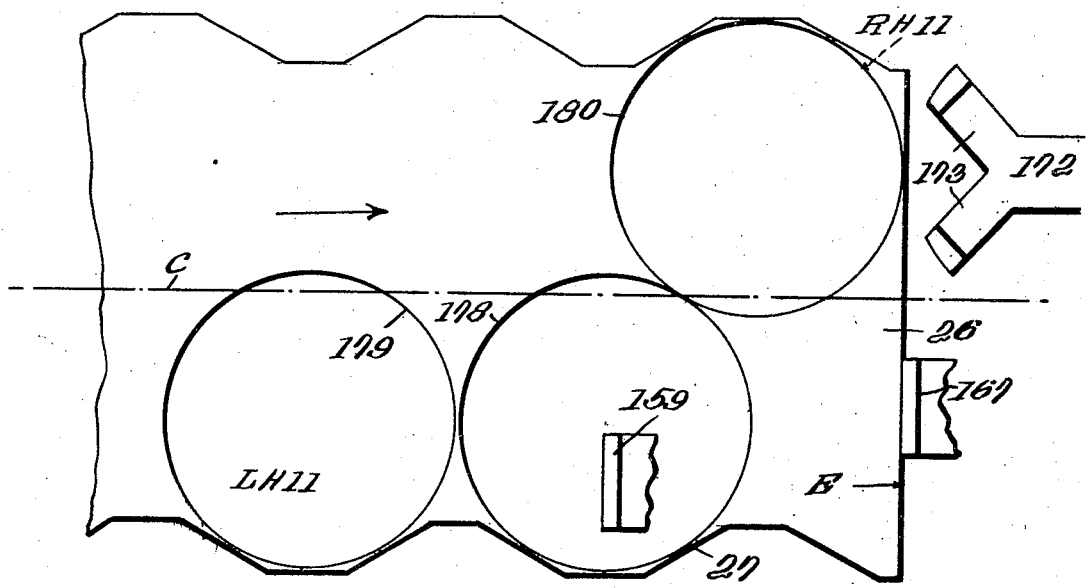

Dec. 15, 1942.    P. E. PEARSON ET AL    2,305,191
PUNCH PRESS
Filed June 24, 1941    15 Sheets-Sheet 12
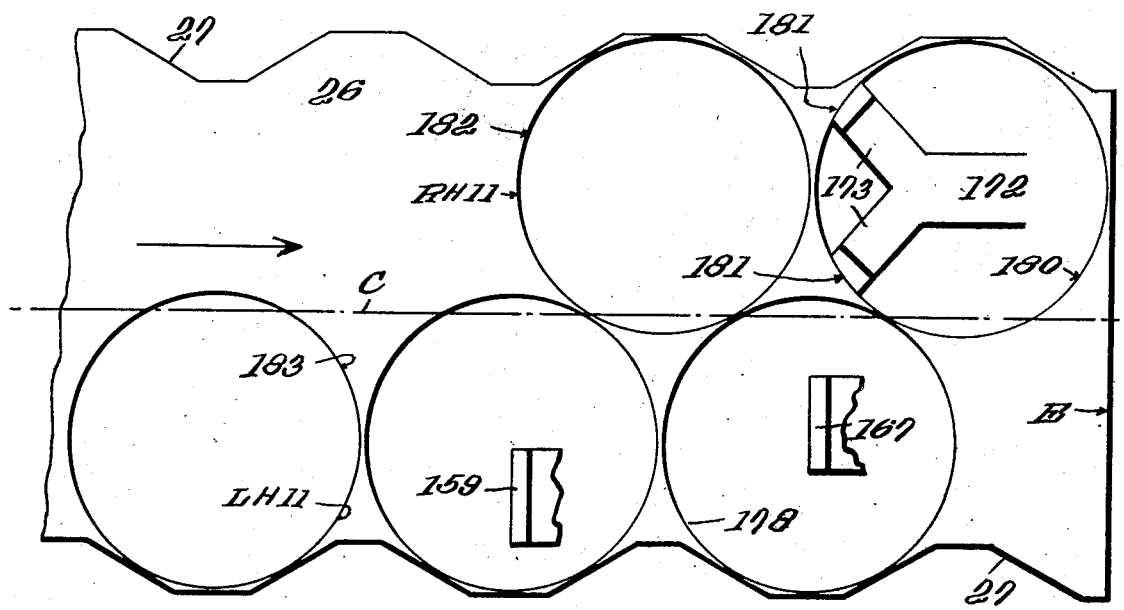
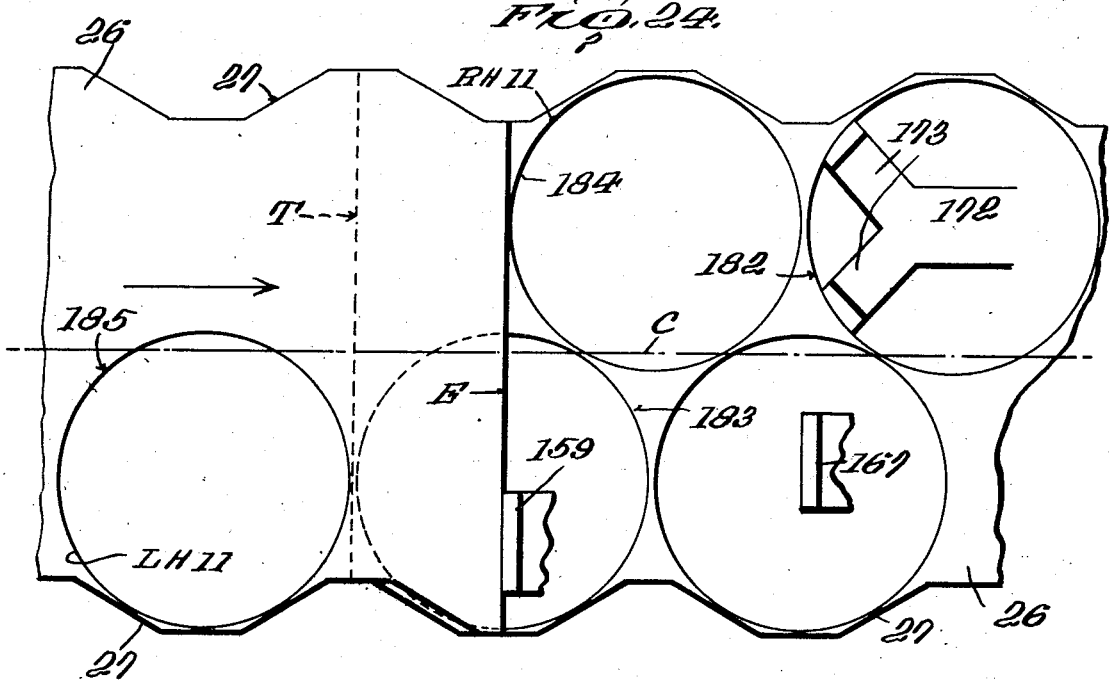

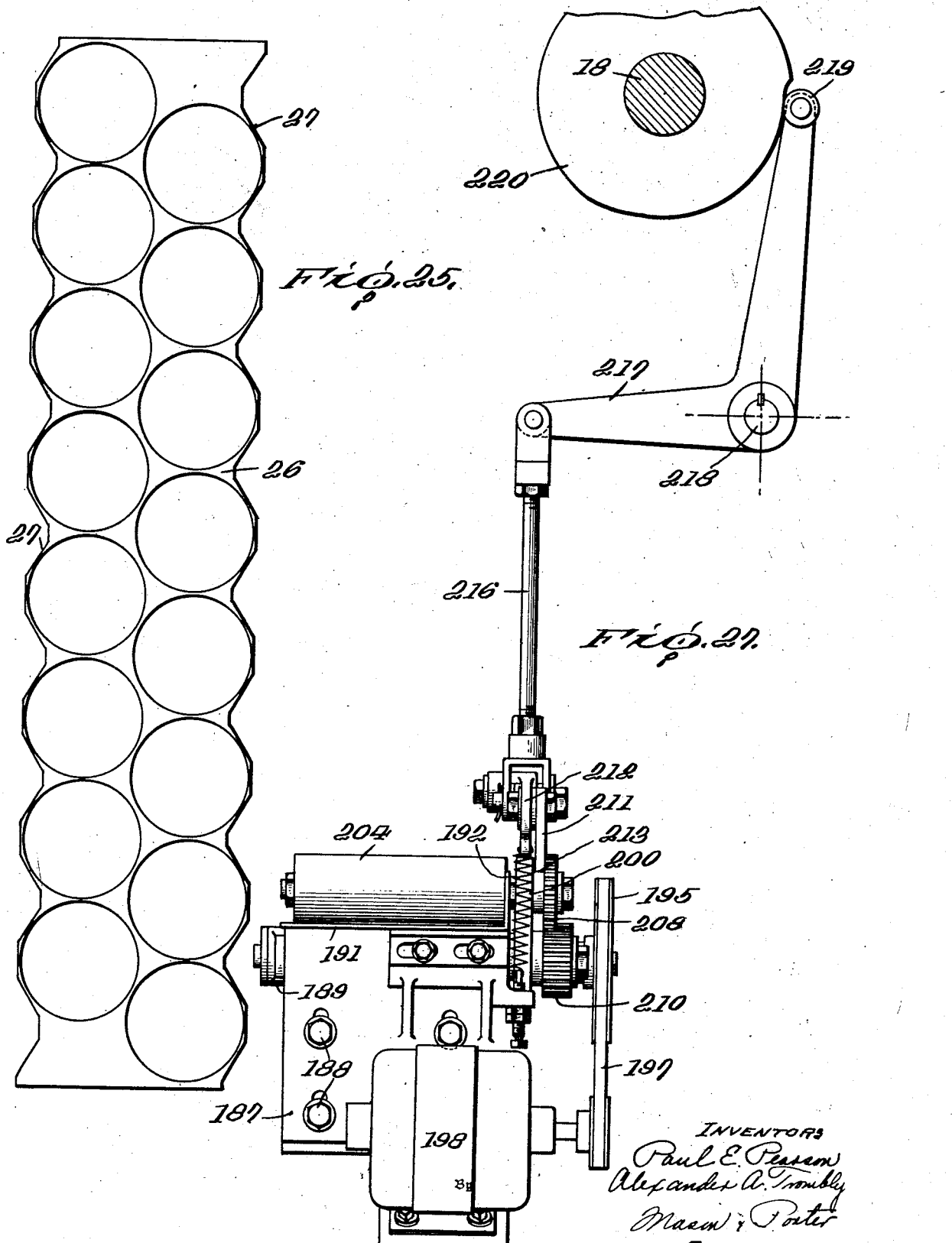

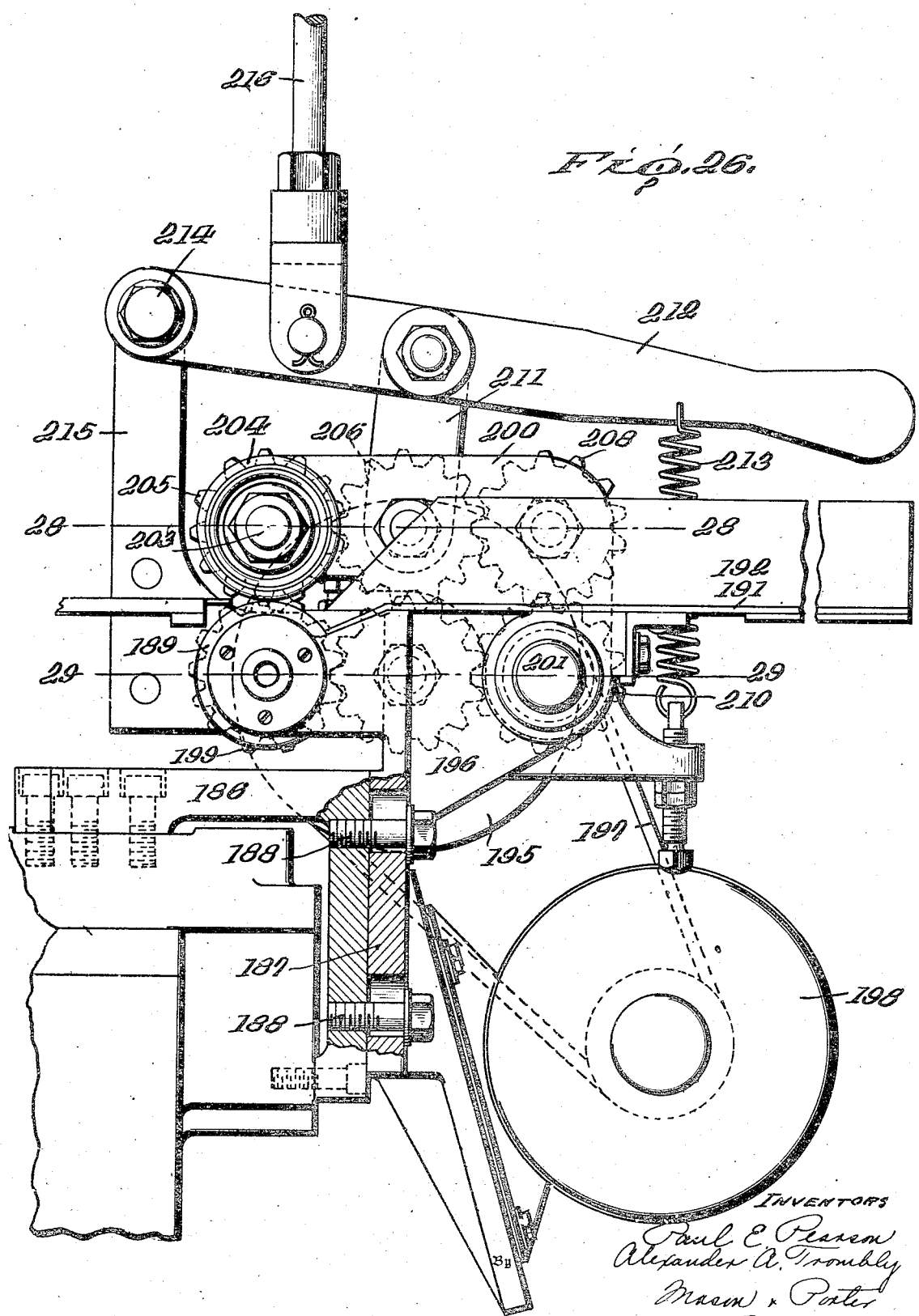

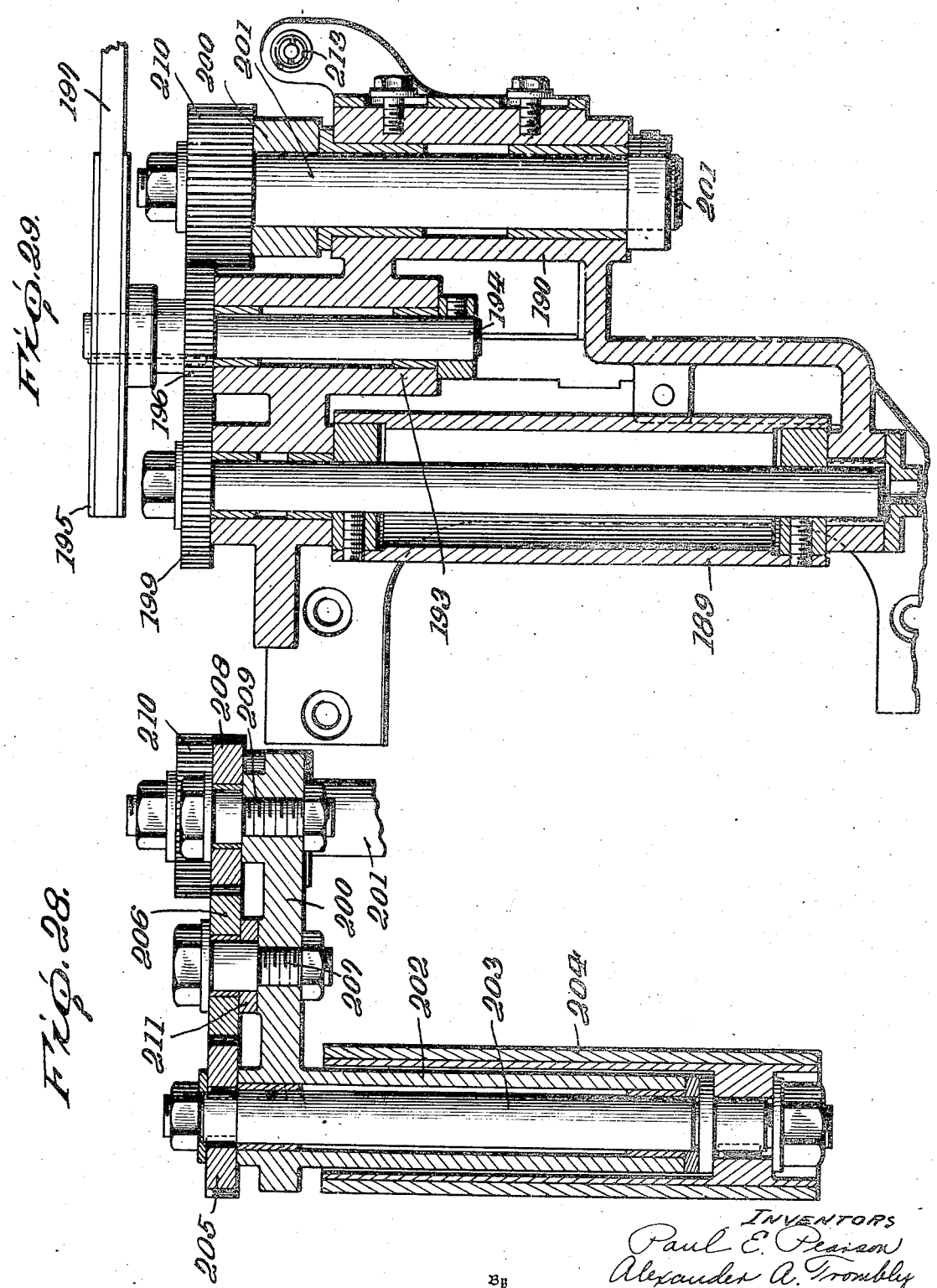

Patented Dec. 15, 1942

2,305,191

UNITED STATES PATENT OFFICE 2,305,191

PUNCH PRESS

Paul E. Pearson and Alexander A. Trombly, Chicago, Ill., assignors to Continental Can Company, Inc., New York, N. Y., a corporation of New York Application June 24, 1941, Serial No. 399,548

18 Claims. (Cl. 164—88)

The invention relates generally to punch presses of the type employed in forming circular end closures for cans or like containers, and it primarily seeks to provide certain new and useful improvements in these presses designed to minimize the amount of scrap metal losses incident to the formation of said end closures.

According to the invention, the end closures are punched from individual strips of uniform width and length, the strips being fed step-by-step to the punching and forming dies, said dies being arranged so as to provide a minimum of scrap metal thickness between the circular cuts, and novel stop gage equipments being provided for placing the strip before each successive punching stroke with such accuracy that the circular cuts can be placed as closely as .035 of an inch apart without danger of intercutting or the deformation of the very narrow scrap joints by gage contact with resultant disruption of the accuracy of the gaging function.

Another object of the invention is to provide a novel punch press structure of the character stated in which provision is made for forming a given number of end closures from a material strip which is narrower in width and shorter in length than strips from which a like number of such end closures have been procurable in the past.

Another object of the invention is to provide a punch press structure of the character stated in which the dies are disposed in staggered relation at opposite sides of and slightly overlapping the center line along which the strips are fed, with their centers spaced longitudinally or in the direction of feed only slightly more than one and one-half times their diameter, thereby to provide minimum scrap thicknesses between punch cuts, three vertically projectable and retractable gages being provided, two of which are successively engaged by the leading edge of each strip and subsequently rise ineffectively within openings punched through the scrap, and a third of which has position gaging contact in openings punched through the scrap and is Y-shaped to contact the scrap metal at opposite sides of a line drawn centrally through said openings in the direction of feed.

Another object of the invention is to provide a punch press structure of the character stated embodying dies arranged in the manner stated, three gages of the nature stated, and means for feeding the strips step-by-step, all cooperatively arranged and operated so that the first engaged strip edge stop stops the strip under the first encountered die to cause it to make a first single cut in the advance end of the particular strip, the second engaged strip edge stop stops the strip under both dies to cause them to make a first double cut in the strip, and the third engaged or Y-shaped stop engages in a punch die formed opening in the strip to stop the strip under both dies at subsequent successive feed steps to cause said dies to form succeeding double cuts.

Another object of the invention is to provide a punch press of the character stated in which novel means is provided for avoiding idle strokes of the punches, or, stated another way, in which novel means is provided for causing the dies to make double cuts at every stroke, both of the double cuts being made in a given strip when made intermediately of its ends, and one such cut being made in the end of one strip and the other thereof in the leading end of the next or infeeding strip each time the trailing end of one strip and the leading end of the succeeding strip thus come under said dies.

Another object of the invention is to provide in a punch press of the character stated and embodying dies arranged in the specific manner stated, means for causing each infeeding strip into initial punching position in lapped relation to the preceding strip so that the descending punches can engage and simultaneously punch through the trailing end of said preceding strip and the leading end of the succeeding strip.

Another object of the invention is to provide in a strip overlapping means of the character stated novel means for simultaneously moving the preceding strip and the succeeding strip with the latter moving more rapidly than the former, thereby to provide the desired strip end overlap, and means for guiding the faster moving strip end to prevent edge abutment thereof with the trailing end of the preceding strip.

Another object of the invention is to provide novel means for rapidly discharging from the press strip scrap or residue from the punching from each strip of the end closures.

With the above and other objects in view that will hereinafter appear, the nature of the invention will be more fully understood by following the detailed description, the appended claims, and the several views illustrated in the accompanying drawings.

In the drawings:

Figure 2 is a left end elevation of the structure illustrated in Figure 1.

Figure 3 is a diagrammatic plan view illustrating the manner in which the strips are fed up to the dies before making the initial cut therein.

Figure 4 is a detail vertical longitudinal section illustrating the strip feeding means.

Figure 5 is an enlarged detail side elevation illustrating one of the placer finger assemblies.

Figures 6, 7 and 8 are detail vertical cross sectional views respectively illustrating one of the placer assemblies, one of the main feed finger assemblies, and the end finger assembly.

Figure 9 is a plan view illustrating the delivery end of the feed table, the top feed plate and the arrangement of the underlying dies, portions of the frame structure being illustrated in horizontal cross section.

Figure 10 is a fragmentary vertical longitudinal section taken on the line 10—10 on Figure 9.

Figure 11 is a fragmentary vertical cross section taken on the line 11 on Figure 9.

Figure 12 is an enlarged fragmentary plan view illustrating the idle stroke eliminating structures shown in Figure 11.

Figure 13 is a detail vertical longitudinal section taken on the line 13—13 on Figure 12.

Figure 14 is a detail vertical longitudinal section taken on the line 14—14 on Figure 12.

Figure 15 is a detail vertical longitudinal section taken on the line 15—15 on Figure 9.

Figure 16 is a vertical cross section taken on the line 16—16 on Figure 9.

Figure 17 is a detail vertical cross section taken on the line 17—17 on Figure 9.

Figure 18 is a detailed longitudinal section taken on the line 18—18 on Figure 9.

Figure 19 is a detail end elevation and part vertical cross section illustrating the adjustable mounting of the delivery end of the top plate.

Figure 20 is a somewhat diagrammatic vertical cross section illustrating the positioning and manner of operation of the gage carrying yoke.

Figure 21 is a diagrammatic view illustrating the positioning of a strip for the making of the first single cut therein, the first engaged gage stop being effective.

Figure 22 is a diagrammatic view illustrating the positioning of a strip for the making of the first double cut therein, the second engaged gage stop being effective.

Figure 23 is a diagrammatic view illustrating the positioning of a strip for the making of the second double cut therein, the Y-shaped gage stop being effective for positioning this and subsequent double cuts.

Figure 24 is a diagrammatic view illustrating the positioning of the trailing end of an outfeeding strip and the leading end of an infeeding strip for having a double cut made in said ends, one cut in said trailing end and the other cut in said leading end, the Y-shaped gage stop and also the first engaged gage stop being effective in this positioning of the strips.

Figure 25 is a detail view illustrating a scrap strip from which the full complement of end closures have been punched.

Figure 26 is a detail side elevation illustrating the scrap ejecting means.

Figure 27 is a detail end elevation illustrating the scrap ejecting means.

Figure 28 is a horizontal section taken on the line 28—28 on Figure 26.

Figure 29 is a detail horizontal section taken on the line 29—29 on Figure 26.

Figure 1:
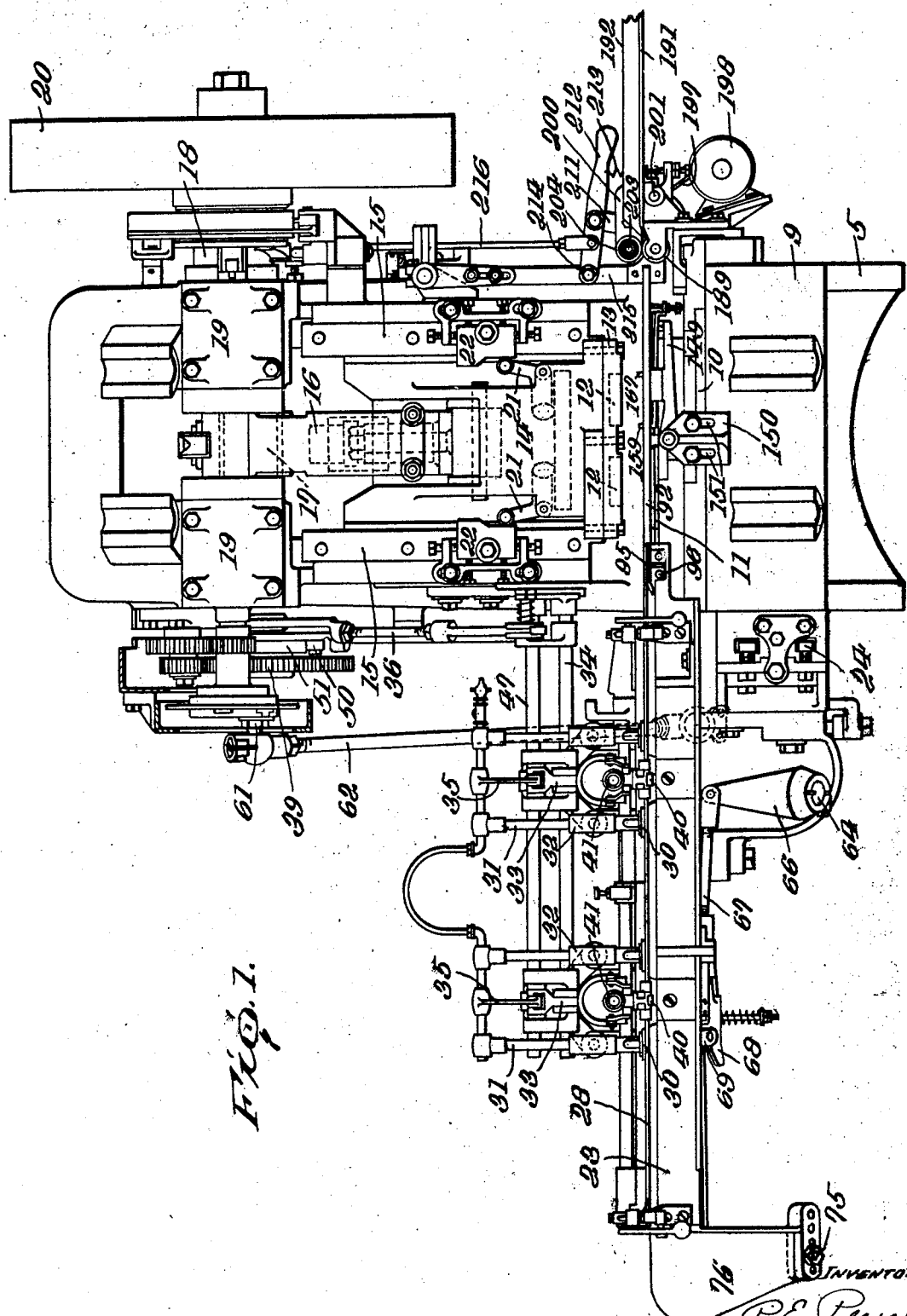
Figure 1 is a face view of a press structure embodying the invention.

In the punch press herein illustrated as an example of embodiment of the invention, there is included a base 5 and a main frame comprising side or cheek plates 6 connected by cross webs 7 and adjustably secured upon the base in the usual manner as at 8.

The main frame includes, a table portion 9 which supports a press bed 10 on which are mounted two die units 11 of suitable form for shaping the can end closures formed in the punch press. Two reciprocable punch units 12 cooperate with the dies and are carried on a plate 13 removably secured to the lower end of a cross head 14 which is reciprocable in guides 15 formed on the frame plates 6 and connected by an adjustable pitman 16 with the crank 17 of a crank shaft 18 rotatable in bearings 19 provided therefor on the main frame.

The crank shaft 18 is equipped with a flywheel 20 which may be belt driven in the usual manner for imparting rotation to the crank shaft and reciprocation to the cross head 14. Individual punch actuators 21 are rockably mounted on the cross head and are engageable with a stationary cam 22 adjustably supported on the main frame for imparting the customary punching motion to the punch elements.

A feed table 23 is mounted for horizontal and vertical adjustments, as at 24, at one side of the main frame table portion 9 and provides supporting ways 25 for the individual strips 26 from which the can end closures are stamped. Each strip 26 includes staggered scroll edge portions 27.

The feed table structure includes a stack support 28 for supporting a stack of the individual strips 26, and this support includes end elements or stop guides 29 for determining the position of the strip stack on said support.

While the machine is functioning, the strips are individually lifted from the stack by suction cups 30 mounted on carriers 31 which are vertically reciprocable in guides 32. The reciprocatory movement of the carriers is imparted by crank levers 33 secured upon a rock shaft 34, said levers being link-connected, as at 35, to the carriers 31, and said rock shaft being crank and pitman connected, as at 36, with an eccentric 37 secured upon a rotary shaft 38. It will be obvious that as the shaft 38 is rotated, rocking motion will be imparted to the shaft 34, and this rocking motion will be transmitted in the form of reciprocatory motion to the carriers 31.

The shaft 38 is rotatably supported in one of the frame cheeks 6 and has rotation imparted thereto through spur gear and pinion connections 39 with the crank shaft 18.

The strips 26, lifted individually from the stack support 28, are fed laterally on the strip supporting ways 25 of the feed table by feeders 40 which are horizontally slidable on rods 41, the edges of the strips passing into a V-shaped guide notch 42 formed between the supporting way or guiding surface of the feed table and the feed table top plate 43, said top plate being swingably mounted, as at 44, on the feed table so that it can be swung upwardly to render accessible the top of the table.

The feeders 40 are link-connected, as at 45, with crank arms 46 secured upon a rock shaft 47 rockably mounted in bearings above the feed table. Rocking motion is imparted to the shaft 47 by a crank arm 48 secured thereon and connected with a pitman 49 to which reciprocatory movement is imparted by a roller 50 engaged by a cam 51 rotatable with the shaft 38.

In order to suitably draw a vacuum in the suction cups 30 in timed relation for individually lifting them from the stack into position for being transversely fed by the feeder elements 40, there is provided a vacuum drawing pump 52 which is driven by suitable transmission connections 53 from the crank shaft 18. The pump is connected by suitable conduits 54 with the suction cups, and the timing of the suction in the cups is controlled by a valve 55 which is actuated by a cam 56 rotatable with the large spur gear of the rotation transmitting connections 39 hereinbefore referred to.

A feed bar slideway 57 is provided in the feed table, and a main feed bar 58 is reciprocably mounted in said slideway. The feed bar 58 has a feed bar slideway 59 formed therein, and a second or placer feed bar 60 is reciprocably mounted in this slideway 59.

For imparting the desired reciprocatory movements to the feed bars 58 and 60, there is provided an adjustable crank 61 on the crank shaft 18, said crank being pitman connected, as at 62, with a crank 63 secured upon a shaft 64 which is rockably mounted in a bearing 65 provided therefor beneath the feed table. The rock shaft 64 carries a crank 66 which is connected by an adjustable link 67 and an overload release couple 68 with a bracket 69 secured to the main feed bar 58, said bracket being equipped with a yieldable bumper 70 engageable with an adjustable stop 71 beneath the feed table. The bracket 69 is in turn link-connected, as at 72, with an oscillatable lever 73, the link being adjustably connected with said lever, as at 74, intermediately of the ends of said lever. The lever 73 is oscillatable about a fulcrum 75 adjustably secured on a bracket 76 depending from the feed table. The fulcrum 75 is provided at the lower end of the lever 73, and at its upper end said lever is adjustable-link connected, as at 77, to a couple 78 adjustably mounted on a rod 79 which is secured to and extends from an end of the second or placer feed bar 60.

While the strips 26 are fed step-by-step along the said table, they are edge guided by a bar 80. For imparting the desired step-by-step movements to the strips, the feed bars 58 and 60 are provided with suitable feeding fingers. There are included two sets of such fingers; a set of placer fingers which feed the strips up to the position at which they receive the first single cut, and a set of feeder fingers for imparting the step-by-step movements which position the strips for successive double cuts, and this last mentioned set of fingers includes an end finger which imparts the final movement to each strip to position the same for receiving the final individual cut in a manner to be described in greater detail hereinafter.

Three placer finger assemblies generally designated 81 are removably secured, as at 82, to the placer feed bar 60, and each of these assemblies includes a body which is secured to said bar and on which a finger carrier 83 is slidably mounted, the sliding movement of the carrier relative to the assembly body being resisted by a compression spring 84 and limited by end stops 85. A placer finger 86 is pivotally supported on each carrier 83, and the leading end of each finger is urged upwardly a limited distance by a compression spring 87.

A plurality of feed finger assemblies 88 are removably secured, as at 89, to the main feed bar 58, one such assembly being provided for each punch cut to be made along a given side of one of the strips 26. Each of these assemblies is constructed in the same manner as are the placer finger assemblies 81 which were specifically described hereinabove, and the spring elevated feeder elements of the assemblies are designated 90, the endmost finger disposed nearest the dies 11 and termed the end finger being designated 91. All of the fingers 86, 90 and 91 are yieldably mounted so that they can positively press the strip against the positioning stops hereinafter to be described without buckling or damaging the edges of the strips. The feeder finger and end finger assemblies are rigidly secured to the main feed bar 58 so as to be movable therewith in the manner illustrated in Figures 7 and 8.

It will be observed that because of the connection of the link 72 intermediately of the ends of the oscillatable lever 73, and the connection of the upper extremity of this lever with the placer feed bar 60, differential movement will be imparted to the feed bars 58 and 60. Thus longer step movements are imparted to the strip while it is being moved up to the position for receiving the first punch cut than are imparted to the strip to place it for subsequent cuts, and in this manner the movement being imparted to the leading edge of each incoming strip being fed by the placer bar 60 is more rapid than the outgoing movement being imparted to the trailing end of a strip by the main feed bar 58. This differential feed movement is utilized to bring about an overlapping of trailing and leading strip end portions and the avoidance of idle strokes of the punches in a manner to be described in detail hereinafter.

A top plate 92 is mounted above the press bed. This plate is removably secured at one side of one end thereof to the feed table 23 by a securing key 93, and at the other side of said end, by a similar securing key 94, to a shelf and strip feedway extension member 95 which is in turn secured, as at 96, to the feed table. At its other end the top plate 92 carries a depending cross head 97 overlying a wedge block 98 secured, as at 99, to the press table 9. A wedge block 100 is interposed between the wedge block 98 and the cross head 97 and is laterally adjustable through the medium of a captive screw 101 for vertically adjusting the overlying end portion of the top plate 92. This end extremity of the top plate carries a strip edge guiding angle 102 which is laterally adjustably mounted on the top plate, as at 103, and serves to guide strip scrap to the ejecting rolls which will be described in detail hereinafter.

The plate includes an opening 104 for accommodating the positioning of the lower left hand die 11 and an opening 105 for accommodating the positioning of the upper right hand die 11, the upper and lower designations of the die positionings having reference to the positioning of the dies as viewed in Figures 3 and 9. This plate also is equipped with a first engaged gage movement accommodating opening 106, a second engaged gage movement accommodating opening 107, and also an opening 108 for accommodating the movement of the third engaged Y-shaped or forked gage to be described in detail hereinafter. The plate also includes a slot 109 for accommodating movement of the end finger 91 and extending from an idle stroke eliminator positioning clearance 110.

For edge guiding strips 26 over the top plate 92 there are provided an edge gage bar 111 having a beveled recessed end 112 adjacent the feed table 23, and an aligned edge gage bar 113 which may include an overhanging extension portion 114 for overlying and preventing jumping of the engaging strip edge portion.

An idle stroke eliminator equipment is provided and includes a top plate extension 115 which is secured, as at 116, to the top plate 43 which overlies the feed table 23 so as to be vertically displaceable with said top plate. See Figures 9, 12, 13 and 14. A supporting member 117 is flange-secured, as at 118, to the top plate extension 115 and laterally slidably supports a gage bar 119 carrying a gage member 120. The gage bar carries a plunger 121 which is slidably supported in a lug 122 on the support member 117 and carries an abutment head 123. A compression spring 124 is interposed between the lug and the abutment head and serves to yieldably or floatably mount the gage member 120. The support 117 overlies a deflector plate 125 supported on a yoke 126 which is pivotally mounted, as at 127, on a support flange 128 secured, as at 129, to the feed table 23. The plate 125 is yieldably held in a slightly upwardly inclined position by a compression spring 130 interposed between the plate and a boss 131 carried by the flange 128. Thus positioned, the plate 125 serves to deflect the leading edge of each infeeding strip 26 upwardly in the manner illustrated in Figure 14, thereby to overlap the trailing edge of the outfeeding strip.

The upwardly deflected leading edge of each incoming strip 26 is engaged and deflected downwardly by a leaf spring 132 secured to the support member 117 and which serves to assure proper engagement of said leading edge under the beveled receiving edge 133 of a holddown or guide plate 134 which is secured upon the top plate 92, as at 135, and extends over the end feed finger accommodating slot 109 of the top plate. The plate 134 includes an extension 136 which projects in the direction of feed of the strips and is received in a clearance 137 provided in the under surface of a friction or holddown member 138. The member 138 is hingedly mounted, as at 139, on the top plate 92 and extends transversely across approximately one-half the width of said plate. The free end of the member is equipped with a holddown finger extension 140 which closely overlies the die 11 in the plate opening 105 in the manner illustrated in Figure 11 in a manner for holding the strip and greatly facilitating punching operations. The member 138 is apertured to permit projection therethrough of a stud 141 projecting upwardly from the top plate 92, said stud being equipped with an abutment head 142, and a compression spring 143 being interposed between the abutment head and the top surface of the member 138 for yieldably holding the member downwardly.

If desired, a hinge-mounted, spring-held friction member 143a may also be provided adjacent the top plate opening 104 to serve a purpose similar to that just above described in connection with the friction or holddown member 138, 140.

A leaf spring 144 projects upwardly from the top plate 92 in position for engaging with scroll projections 27 which pass over the die position accommodating opening 105 in the top plate, and this spring member serves to prevent catching of the scroll edge portions in said opening.

An edge gage and holddown member 145 is provided and is floatably mounted, as at 146, through an opening in the top plate 92 and in a support 147 secured beneath said plate. This member overlies the adjacent edge portions of strips as they are being punched and prevents the displacement of the strip. A longitudinal edge guide 148 is mounted on the top plate 92 and similarly overlies strip edge portions for preventing upward displacement thereof.

The three, successively engaged gage elements forming an important part of the invention will now be described. A gage yoke 149 is rockably mounted in bearing brackets 150 vertically adjustably supported, as at 151, on the press head. The yoke includes a crank extension 152 which is pitman connected, as at 153, to one arm of a bell crank lever 154 which is pivotally secured on a bracket 155 affixed to the upper frame cross web 7. The other arm of the bell crank lever carries a roller 156 engaged with an eccentric cam 157 rotatable with the crank shaft 18, the lever 154 being held against the cam by an anchored spring 158. It will be obvious that as the cam rotates, upward and downward rocking motion will be imparted to the yoke 152. This yoke carries the three gages hereinbefore briefly referred to, and each time the yoke is lifted these gages are projected upwardly through the respective openings 106, 107 and 108 in the top plate 92. It naturally follows that when the yoke is lowered the gages are lowered beneath the top surface of the top plate.

The first engaged gage member 159, vertically projectable and retractable through the opening 106, is carried by an angle bent bar 160 which is pivotally support, as at 161, in a U-shaped bracket 162 slot and screw secured, as at 163, upon the yoke 149. The end of the bar 160 opposite the gage member 159 is depressed, as at 164, and is urged upwardly by a compression spring 165 interposed between the bar end and the underlying portion of the yoke, and upward movement of this bar end is limited by a stop screw 166 carried by the depressed end 164 and engageable with the under surface of the top plate 92.

The second engaged gage member 167, projectable and retractable through the plate opening 107, projects upwardly from a bar 168 which is slotted to receive a clamp screw 169 which secures the bar to the yoke 149, and the end of this bar remote from the gage 167 is bent downwardly, as at 170, and is equipped with an adjuster screw 171 threadably engaging the yoke.

The third effective gage 172 hereinbefore referred to as the fork or Y gage, and which is projectable and retractable through the top plate opening 108, includes spread fingers 173 engageable at opposite sides of the center line of scrap openings formed by the punch and die equipments hereinbefore referred to as upper right hand, this position designation having reference to Figures 3 and 9. By thus engaging the scrap, contact at the extremely narrow juncture between punched openings is avoided. The stop 172, 173 projects upwardly from a bar 174 which is slotted to receive a clamp screw 175 by which the bar is secured to the yoke 149, and like the second engaged gage bar the end of this bar remote from the gage 172, 173 is angle bent, as at 176, and is equipped with an adjuster screw 177 threadably engaged with the yoke.

It will be obvious that by loosening the clamp screws 169 or 175, manipulating the adjuster screws 171 or 177, and again tightening said clamp screws, adjustment of the positions of the gages 167 and 172, 173 can be effected and secured. It will also be apparent that by utilizing the slot and screw securing means 163 for the bracket 162, the position of said bracket can be altered to vary the position of the gage 159. It will also be obvious that as the yoke 149 is moved downwardly, the spring 165 will move the end of the bar 160 remote from the gage bearing end upwardly, and because of the pivotal connection of the bar with the bracket 62, downward movement of the gage 159 will be compounded.

In describing the operation of the novel equipments hereinbefore described, attention is directed to Figures 21 to 24. When operation of the press is started, the first strip 26 to be fed and have end closures formed therefrom is lifted as a result of the initial reciprocation of the suction cups 90 and is shifted laterally by the feeders 40 onto the strip supporting surface or way 25 of the feed table and against the edge guide or bar 88. The strip is fed step-by-step along the way 25 by the placer fingers 86 in the manner illustrated in Figure 3 until the leading edge E of the strip is brought into contact with the first engaged gage 159 in the manner illustrated in Figure 21. The successive gaging steps are best illustrated in diagrammatic Figures 21 to 24. In these particular diagrammatic illustrations in which parts are illustrated in plan view, the dies are hereinafter referred to as LH11 and RH11, thus referring to the respective left hand and right hand positioning of these dies in these particular figures. It will be understood, of course, that the parts are so timed that the gage 159 rises in time to intercept and definitely stop movement of the leading edge E of the strip. It will be noted by reference to Figure 21 that this leading edge of the strip is stopped just short of overlying die RH11 and in position for having the first cut made therein over die LH11. This first cut is a single cut. It will be observed by reference to these diagrammatic figures that the dies LH11 and RH11 are spaced apart longitudinally, that is, in the direction of feed of the blanks only slightly more than one and one-half times the diameter of the punch cuts made in the strip, and that they are disposed in staggered relation at opposite sides of and slightly overlapping the center line C along which the strips are fed. The single punch cut made at this position of the strip is indicated at 178 in Figure 21.

Following the initial gage positioning of the first fed strip just above described, the step-by-step feeding of the strip is taken over by the main feed fingers 80. At the next step feed, the leading edge E of the strip is positively stopped by the second gage member 167 as illustrated in Figure 22, and in this position the strip overlies both guides LH11 and RH11 so that on the next descent of the punch elements a double cut is made as indicated at 179 and 180 on said Figure 22. It is to be understood, of course, that during the feeding of the strip to this position the feeding movement took place while the first gage 159 was depressed below the top plate 92, and when the second gage was lifted into the position illustrated for intercepting and accurately stopping the leading edge E of the strip, said first gage was similarly lifted but had no gage function because it was positioned within the previously made cut indicated at 178 in Figures 21 and 22.

Following the gaging steps just above described, subsequent gaging contacts with this initially fed strip are effected by the third gage 172, 173. Thus on the third step movement imparted to the strip by the main feeding fingers 80, the spread third gaging fingers 173 engage in the punch cut 180, as at 181, in the manner illustrated in Figure 23 thereby to positively stop the strip in position over the dies LH11 and RH11 for permitting a double cut 182, 183 to be made therein. This gage operation and double cutting is repeated at each step feed of this strip until the last double cut is formed in the strip, such last double cut being illustrated in Figure 24. It is to be understood that each time the gage 172, 173 performs its gaging function, the other gages 159 and 167 rise ineffectively in previously made cuts in the manner illustrated in said Figure 24.

As successive strips are fed, the idle stroke eliminating equipment functions to cause the leading end E of an incoming strip to overlap a trailing end T of an outfeeding strip so that on the stroke of the punch elements effected while this overlapped condition obtains, a double cut can be made with one of the cuts, 184, being made by the die RH11 in the trailing end of the outgoing strip and the other of the cuts, 185, being simultaneously made by the die LH11 in the leading end of the incoming strip in the manner illustrated in Figure 24. This overlapping of the strip ends is brought about because the plate 125 deflects the leading edge of the incoming strip upwardly in the manner hereinbefore described. While both strips are being moved simultaneously by the respective fingers 80 and 86, the placer fingers 86 are moved more rapidly than are the fingers 80 and the upwardly deflected end E of the incoming strip is caused to overlap the trailing end T of the outgoing strip in the manner indicated. It will be observed by reference to Figure 24 that the first gage 159 intercepts and accurately stops advance movement of the leading edge E of the overlapping incoming strip, said gage moving upwardly through the last made cut in the outfeeding strip. It will be observed that the leading edge E is stopped just short of die RH11 and that at the time the double cut is made at 184, 185 in the respective ends of the strips, the trailing end T of the outfeeding strip is just beyond the die LH11 so that no clipping or intercutting is effected during this double cutting operation.

The double cutting or closure end forming operations above described are continued as long as the press is operated, strokes of the punch elements, except the first described single cut, effecting a double cutting operation in the manner described thereby eliminating idle strokes.

During the feeding of the strips across the top plate 92 and the punching of end closures therefrom, the plate 134 serves to guide the strips and hold them close to the top plate 92, thereby to prevent jumping of the first gage 159. This plate also serves to cover the end finger 91 while it is in its advanced feeding position. The floatably mounted gage members 120 and 145 assure a proper contact of the strip with the fixed edge guiding elements at the opposite side of the top plate, and the element 145 also serves to keep the strip close to the top plate and prevent jumping of the gage stops. The holddown function of the part 145 is supplemented by the element 148, and the friction members 146 and 146a serve additionally to hold the strip down at the die opening and facilitate the punch forming operation.

After all of the intended cuts are made in a given strip 26, it is rapidly ejected from the press. The finally effective feed movement of the end finger 91 feeds the leading edge of the strip scrap between the then separated feeding rollers which accomplish this rapid ejection of the scrap.

The scrap ejecting equipment will now be described.

An angle bracket 186 is secured upon the bed plate at the delivery end of the press. A supporting bracket 187 is vertically-adjustably mounted, as at 188, on the angle bracket 186 and is equipped with bearings for the trunnions of a lower scrap feeding roller 189. The bracket 187 also carries a transverse bearing boss 190 and a scrap feed-out supporting table 191 disposed at the level of the upper surface of the roller 189 and including an upstanding edge guide 192. Another bearing boss 193 is provided on the bracket 187 and rotatably supports a stud shaft 194 carrying a pulley 195 and a gear 196. The pulley 197 is driven by belt and pulley connections 197 from a motor 198 supported on the press frame, and this rotation is imparted by the gear 196 to a meshing gear 199 rotatable with lower feed roller 189.

A roller supporting arm 200 is provided and is attached to a mounting shaft 201 which is rockably supported in the previously mentioned bearing boss 190. The arm 200 is equipped with a transverse bearing 202 in which is rotatably supported the upper feed roll shaft 203 to which the upper feed roller 204 is fixed. The shaft 203 carries a gear 205 to which rotation is imparted by an idler gear 206 which is rotatable about a stub shaft 207 fixed to the arm 200 and which is in turn driven by a gear 208 loosely mounted on a stub shaft 209 also secured to the arm 200. The gear 208 is in turn driven by a gear 210 loosely surrounding the shaft 201 and driven by the previously mentioned gear 199.

The arm 200 is link-connected, as at 211, with a lever 212 which is normally held down in position for causing the upper and lower rollers 204 and 189 to contact by an anchored spring 213. The lever 212 is pivoted at its end, as at 214, to a fixed support 215 and is connected by a link 216 with one arm of a bell crank lever 217. The bell crank lever 217 is pivoted, as at 218, on the machine frame and has its other arm equipped with a roller 219 in contact with an actuator cam 220 secured upon the crank shaft 18.

Because of the provision of the intermeshing gearing connections hereinbefore described, both scrap feeding rollers 204 and 189 are constantly driven, and the cam 220 is shaped and positioned in suitably timed relation with the main feed bar so that the arm 200 will be lowered into strip feeding position each time the end finger 91 has fed the leading edge of a scrap strip between the upper and lower rollers 204, 189, and after the immediately following punch projection and retraction, thereby to effect a rapid ejection of the scrap from the press. It is to be understood, of course, that the stop gages are so timed that they are retracted below the top surface of the top plate 92 at the time this rapid ejection of scrap occurs.

It is of course to be understood that the details of structure and arrangement of parts may be variously changed and modified without departing from the spirit and scope of my invention.

We claim:

1. In a punch press wherein can end closures or the like are formed from blank material fed therethrough, cooperating punch and die equipment, means for feeding the blank material step-by-step to and past said equipment to cause it to form said closures and punch openings in the material very closely spaced along a line passing centrally through said openings and thereby leaving very thin and fragile waste blank material portions intervening the punch openings along said line, and a positive stop gage movable upwardly and downwardly through said openings and engageable with the material in said openings and at opposite sides of said line and away from said fragile material portions for determining the spaced relation of said openings.

2. In a punch press wherein can end closures or the like are formed from blank material fed therethrough, cooperating punch and die equipment, means for feeding the blank material step-by-step to and past said equipment to cause it to form said closures and punch openings in the material very closely spaced along a line passing centrally through said openings and thereby leaving very thin and fragile waste blank material portions intervening the punch openings along said line, and a single forked positive stop gage movable upwardly and downwardly through said openings and including spread fingers engageable with the material in said openings and at opposite sides of said line and away from said fragile material portions for determining the spaced relation of said openings.

3. In a punch press wherein can end closures or the like are formed from individual strips successively fed therethrough, cooperating punch and die equipment, means for feeding the strips successively and step-by-step to and past said equipment to cause it to form said closures and punch openings in said strips very closely spaced along a line passing centrally through said openings and thereby leaving very thin and fragile waste blank material portions intervening the punch openings along said line, a positive end stop gage engaged by the leading edge of each infeeding strip to position it relative to said equipment for definitely placing a first equipment engagement therewith and subsequently movable upwardly and downward ineffectively in openings formed in the strip by said equipment, a positive stop gage movable upwardly and downwardly through said openings and engageable with the material in said openings and at opposite sides of said line and away from said fragile material portions for determining the spaced relation of said openings, and means for moving said stop gages in timed relation with said feeding means.

4. In a punch press wherein can end closures or the like are formed from individual strips successively fed therethrough, cooperating punch and die equipment, comprising two punch and die sets of circular form disposed in staggered relation respectively overlapping and disposed at opposite sides of a center line along which the strips are fed and spaced along said line a distance just slightly more than one and one half times the diameter of punch openings formed by said punches, means for feeding strips successively and step-by-step to and past said dies thereby to cause said sets to form end closures and punch openings in said strips very closely spaced in two rows along two laterally spaced opening center lines, a first engaged end stop engaged by the leading edge of each infeeding strip to position it relative to said sets for definitely placing a first single set engagement therewith and subsequently movable upwardly and downwardly ineffectively in openings formed in the strip by one said set, a second engaged end stop engaged by the leading edge of each infeeding strip to position it relative to said sets for definitely placing a first double set engagement therewith and subsequently movable upwardly and downwardly ineffectively in openings formed in the strip by one said set, and a stop gage movable upwardly and downwardly through openings formed in the strips and engageable with the strips in said openings and at opposite sides of the center line of the particular row of openings to thereby definitely place subsequently made double set engagements.

5. In a punch press wherein can end closures or the like are formed from individual strips successively fed therethrough, cooperating punch and die equipment, comprising two punch and die sets of circular form disposed in staggered relation respectively overlapping and disposed at opposite sides of a center line along which the strips are fed and spaced along said line a distance just slightly more than one and one half times the diameter of punch openings formed by said punches, means for feeding strips successively and step-by-step to and past said dies thereby to cause said sets to form end closures and punch openings in said strips very closely spaced in two rows along two laterally spaced opening center lines, a first engaged end stop engaged by the leading edge of each infeeding strip to position it relative to said sets for definitely placing a first single set engagement therewith and subsequently movable upwardly and downwardly ineffectively in openings formed in the strip by one said set, a second engaged end stop engaged by the leading edge of each infeeding strip to position it relative to said sets for definitely placing a first double set engagement therewith and subsequently movable upwardly and downwardly ineffectively in openings formed in the strip by one said set, and a stop gage movable upwardly and downwardly through openings formed in the strips and engageable with the strips in said openings and at opposite sides of the center line of the particular row of openings to thereby definitely place subsequently made double set engagements, said strip feeding means serving to feed said strips step distances only very slightly greater than the diameter of said openings following initial positioning of each strip against said first engaged stop.

6. In a punch press wherein can end closures or the like are formed from individual strips successively fed therethrough, cooperating punch and die equipment, comprising two punch and die sets of circular form disposed in staggered relation respectively overlapping and disposed at opposite sides of a center line along which the strips are fed and spaced along said line a distance just slightly more than one and one half times the diameter of punch openings formed by said punches, means for feeding strips successively and step-by-step to and past said dies thereby to cause said sets to form end closures and punch openings in said strips very closely spaced in two rows along two laterally spaced opening center lines, a first engaged end stop engaged by the leading edge of each infeeding strip to position it relatively to said sets for definitely placing a first single set engagement therewith and subsequently movable upwardly and downwardly ineffectively in openings formed in the strip by one said set, a second engaged end stop engaged by the leading edge of each infeeding strip to position it relative to said sets for definitely placing a first double set engagement therewith and subsequently movable upwardly and downwardly ineffectively in openings formed in the strip by one said set, and a stop gage movable upwardly and downwardly through openings formed in the strips and engageable with the strips in said openings and at opposite sides of the center line of the particular row of openings to thereby definitely place subsequently made double set engagements, said feeding means including differential feeding devices effective to cause trailing and leading strip edges to assume overlapped relation whereby one said set will make a single cut in the trailing end of one strip and the other said set will simultaneously make a single cut in the leading end of the incoming strip and thus avoid idle strokes of the punches.

7. In a punch press wherein can end closures or the like are formed from individual strips successively fed therethrough, cooperating punch and die equipment, comprising two punch and die sets of circular form disposed in staggered relation respectively overlapping and disposed at opposite sides of a center line along which the strips are fed and spaced along said line a distance just slightly more than one and one half times the diameter of punch openings formed by said punches, means for feeding strips successively and step-by-step to and past said dies thereby to cause said sets to form end closures and punch openings in said strips very closely spaced in two rows along two laterally spaced opening center lines, a first engaged end stop engaged by the leading edge of each infeeding strip to position it relative to said sets for definitely placing a first single set engagement therewith and subsequently movable upwardly and downwardly ineffectively in openings formed in the strip by one said set, a second engaged end stop engaged by the leading edge of each infeeding strip to position it relative to said sets for definitely placing a first double set engagement therewith and subsequently movable upwardly and downwardly ineffectively in openings formed in the strip by one said set, and a stop gage movable upwardly and downwardly through openings formed in the strips and engageable with the strips in said openings and at opposite sides of the center line of the particular row of openings to thereby definitely place subsequently made double set engagements, said feeding means including a main feed bar effective to feed the strips step distances only slightly greater than the diameter of said openings following initial positioning of each strip against said first engaged stop, and a placer bar effective to feed the strips differentially up to said first engaged stop thereby to cause trailing and leading end portions of successive strips to assume overlapped relation whereby one said set will make a single cut in the trailing end of one strip and the other set will simultaneously make a single cut in the leading end of the following strip with said strip ends overlapped just slightly more than half the diameter of one said opening just clear of and between the punches.

8. In a punch press wherein can end closures or the like are formed from individual strips successively fed therethrough, cooperating punch and die equipment, comprising two punch and die sets of circular form disposed in staggered relation respectively overlapping and disposed at opposite sides of a center line along which the strips are fed and spaced along said line a distance just slightly more than one and one half times the diameter of punch openings formed by said punches, means for feeding strips successively and step-by-step to and past said dies thereby to cause said sets to form end closures and punch openings in said strips very closely spaced in two rows along two laterally spaced opening center lines, a first engaged end stop engaged by the leading edge of each infeeding strip to position it relative to said sets for definitely placing a first single set engagement therewith and subsequently movable upwardly and downwardly ineffectively in openings formed in the strip by one said set, a second engaged end stop engaged by the leading edge of each infeeding strip to position it relative to said sets for definitely placing a first double set engagement therewith and subsequently movable upwardly and downwardly ineffectively in openings formed in the strip by one said set, and a stop gage movable upwardly and downwardly through openings formed in the strips and engageable with the strips in said openings and at opposite sides of the center line of the particular row of openings to thereby definitely place subsequently made double set engagements, said feeding means including a main feed bar effective to feed the strips step distances only slightly greater than the diameter of said openings following initial positioning of each strip against said first engaged stop, and a placer bar effective to feed the strips differentially up to said first engaged stop thereby to cause trailing and leading end portions of successive strips to assume overlapped relation whereby one said set will make a single cut in the trailing end of one strip and the other set will simultaneously make a single cut in the leading end of the following strip with said strip ends overlapped just slightly more than half the diameter of one said opening just clear of and between the punches, said placer bar being slidably supported on said main feed bar and movable through step distances of greater length than those through which said main feed bar is movable.

9. In a punch press wherein can end closures or the like are formed from individual strips successively fed therethrough, cooperating punch and die equipment, comprising two punch and die sets of circular form disposed in staggered relation respectively overlapping and disposed at opposite sides of a center line along which the strips are fed and spaced along said line a distance just slightly more than one and one half times the diameter of punch openings formed by said punches, means for feeding strips successively and step-by-step to and past said dies thereby to cause said sets to form end closures and punch openings in said strips very closely spaced in two rows along two laterally spaced opening center lines, a first engaged end stop engaged by the leading edge of each infeeding strip to position it relative to said sets for definitely placing a first single set engagement therewith and subsequently movable upwardly and downwardly ineffectively in openings formed in the strip by one said set, a second engaged end stop engaged by the leading edge of each infeeding strip to position it relative to said sets for definitely placing a first double set engagement therewith and subsequently movable upwardly and downwardly ineffectively in openings formed in the strip by one said set, and a stop gage movable upwardly and downwardly through openings formed in the strips and engageable with the strips in said openings and at opposite sides of the center line of the particular row of openings to thereby definitely place subsequently made double set engagements, said feeding means including a main feed bar effective to feed the strips step distances only slightly greater than the diameter of said openings following initial positioning of each strip against said first engaged stop, a placer bar effective to feed the strips differentially up to said first engaged stop thereby to cause trailing and leading end portions of successive strips to assume overlapped relation whereby one said set will make a single cut in the trailing end of one strip and the other set will simultaneously make a single cut in the leading end of the following strip with said strip ends overlapped just slightly more than half the diameter of one said opening just clear of and between the punches, and means for deflecting the leading end of each infeeding strip so that it will move into lapped relation to the trailing end of the outfeeding strip and not engage in abutment therewith.

10. In a punch press wherein can end closures or the like are formed from individual strips successively fed therethrough, cooperating punch and die equipment comprising two punch and die sets spaced longitudinally in the direction of feeding movement of the strips, means for feeding the strips successively and step-by-step to and past said sets for causing said sets to make successive double cuts in said strips, said last named means including differential feeding devices effective to cause trailing and leading strip edges to assume overlapped relation whereby one said set will make a single cut in the trailing end of one strip and the other said set will simultaneously make a single cut in the leading end of the incoming strip and thus avoid idle strokes of the punches, a spring pressed plate for upwardly deflecting the leading end of each infeeding strip so that it will overlap and not abut with the trailing end of the outfeeding strip, hold down means for preventing upward buckling of strips while passing through the press, and yieldable means for depressing the upwardly deflected strip ends and guiding them under said hold down means.

11. In a punch press wherein can end closures or the like are formed from individual strips successively fed therethrough, cooperating punch and die equipment, means for feeding the strips successively and step-by-step to and past said equipment to cause it to form said closures and punch openings in said strips very closely spaced along a line passing centrally through said openings and thereby leaving very thin and fragile waste blank material portions intervening the punch openings along said line, a positive end stop gage engaged by the leading edge of each infeeding strip to position it relative to said equipment for definitely placing a first equipment engagement therewith and subsequently movable upwardly and downwardly ineffectively in openings formed in the strip by said equipment, a positive stop gage movable upwardly and downwardly through said openings and engageable with the material in said openings and at opposite sides of said line and away from said fragile material portions for determining the spaced relation of said openings, a rockably mounted yoke supporting said gages, and means for rocking said yoke for imparting up and down movements to said gages in timed relation to said strip feeding means.

12. In a punch press wherein can end closures or the like are formed from individual strips successively fed therethrough, cooperating punch and die equipment, comprising two punch and die sets of circular form disposed in staggered relation respectively overlapping and disposed at opposite sides of a center line along which the strips are fed and spaced along said line a distance just slightly more than one and one half times the diameter of punch openings formed by said punches, means for feeding strips successively and step-by-step to and past said dies thereby to cause said sets to form end closures and punch openings in said strips very closely spaced in two rows along two laterally spaced opening center lines, a first engaged end stop engaged by the leading edge of each infeeding strip to position it relative to said sets for definitely placing a first single set engagement therewith and subsequently movable upwardly and downwardly ineffectively in openings formed in the strip by one said set, and a stop gage movable upwardly and downwardly through openings formed in the strips and engageable with the strips in said openings and at opposite sides of the center line of the particular row of openings to thereby definitely place subsequently made double set engagements, said strip feeding means including yieldably supported feed fingers, a rockably mounted yoke, means adjustably supporting the gages on said yoke, and means for rocking said yoke to impart up and down movements to said gages in timed relation to said strip feeding means.

13. In a punch press wherein can end closures or the like are formed from blank material fed therethrough, cooperating punch and die equipment, means for feeding the blank material step-by-step to and past said equipment to cause it to form said closure and punch openings in the material spaced along a line passing centrally through said openings, a positive stop gage movable upwardly and downwardly into and out of strip intercepting position and engageable with strips for positioning them relative to said equipment, a top plate over which the strips are fed and having openings therein for said equipment and said gage, a gage carrier swingably mounted below the plate, means for swinging the carrier in timed relation to said feeding means, a bar pivoted intermediately of its ends on said carrier and affixed at one end to said gage and having its other end abutting under said plate, and a spring interposed between the carrier and said other bar end for holding said other end against the plate as the carrier moves downwardly thereby to compound the movement of said gage.

14. In a punch press wherein can end closures or the like are formed from individual strips successively fed therethrough, cooperating punch and die equipment comprising two punch and die sets spaced longitudinally in the direction of feeding movement of the strips, means for feeding the strips successively and step-by-step to and past said sets for causing said sets to make successive double cuts in said strips, said last named means including differential feeding devices effective to cause trailing and leading strip edges to assume overlapped relation whereby one said set will make a single cut in the trailing end of one strip and the other said set will simultaneously make a single cut in the leading end of the incoming strip and thus avoid idle strokes of the punches, a spring pressed plate for upwardly deflecting the leading end of each infeeding strip so that it will overlap and not abut with the trailing end of the outfeeding strip, hold down means for preventing upward buckling of strips while passing through the press, yieldable means for depressing the upwardly deflected strip ends and guiding them under said hold down means, fixed edge guides engaged along one edge by said strips, and yieldably mounted edge guides engaged along the opposite edge by said strips.

15. In a punch press wherein can end closures or the like are formed from individual strips successively fed therethrough, cooperating punch and die equipment comprising two punch and die sets spaced longitudinally in the direction of feeding movement of the strips, means for feeding the strips successively and step-by-step to and past said sets for causing said sets to make successive double cuts in said strips, said last named means including differential feeding devices effective to cause trailing and leading strip edges to assume overlapped relation whereby one said set will make a single cut in the trailing end of one strip and the other said set will simultaneously make a single cut in the leading end of the incoming strip and thus avoid idle strokes of the punches, a spring pressed plate for upwardly deflecting the leading end of each infeeding strip so that it will overlap and not abut with the trailing end of the outfeeding strip, a feed table having a delivery end on which said deflecting plate is mounted, a top plate onto which strips are fed from the feed table and having openings therein for accommodating the positioning of the die equipment, hold down means for preventing upward buckling of the strips while on said top plate and supported on said top plate, yieldable means for depressing the upwardly deflected strip ends and guiding them under said hold down means, and means for adjustably mounting the feed table and top plate to enable compensation for alterations in said die equipment.

16. In a punch press wherein can end closures or the like are formed from individual strips successively fed therethrough, cooperating punch and die equipment, comprising two punch and die sets of circular form disposed in staggered relation respectively overlapping and disposed at opposite sides of a center line along which the strips are fed and spaced along said line a distance just slightly more than one and one half times the diameter of punch openings formed by said punches, means for feeding strips successively and step-by-step to and past said dies thereby to cause said sets to form end closures and punch openings in said strips very closely spaced in two rows along two laterally spaced opening center lines, a first engaged end stop engaged by the leading edge of each infeeding strip to position it relative to said sets for definitely placing a first single set engagement therewith and subsequently movable upwardly and downwardly ineffectively in openings formed in the strip by one said set, a second engaged end stop engaged by the leading edge of each infeeding strip to position it relative to said sets for definitely placing a first double set engagement therewith and subsequently movable upwardly and downwardly ineffectively in openings formed in the strip by one said set, a stop gage movable upwardly and downwardly through openings formed in the strips and engageable with the strips in said openings and at opposite sides of the center line of the particular row of openings to thereby definitely place subsequently made double set engagements, each said strip having scroll projections along its lateral edges into which punch formed openings extend, a top plate having openings therein for accommodating the positioning of the dies, and a yieldable element for lifting scroll projections as they approach a die opening for preventing catching of said scroll projections in said die opening.

17. In a punch press wherein can end closures or the like are formed from individual strips successively fed therethrough, cooperating punch and die equipment, means for feeding the strips successively and step-by-step to and past said equipment to cause it to form said closures and punch openings in said strips very closely spaced along a line passing through said openings, a positive end stop gage engaged by the leading edge of each infeeding strip to position it relative to said equipment for definitely placing a first equipment engagement therewith and subsequently movable upwardly and downwardly ineffectively in openings formed in the strip by said equipment, a positive stop gage movable upwardly and downwardly through said openings and engageable with the material in said openings and at opposite sides of said line for determining the spaced relation of said openings, and rotary means effective after the final punching operation upon each successive strip and while the gages are lowered for rapidly ejecting the resulting strip scrap.

18. In a punch press wherein can end closures or the like are formed from individual strips successively fed therethrough, cooperating punch and die equipment, means for feeding the strips successively and step-by-step to and past said equipment to cause it to form said closures and punch openings in said strips very closely spaced along a line passing through said openings, a positive end stop gage engaged by the leading edge of each infeeding strip to position it relative to said equipment for definitely placing a first equipment engagement therewith and subsequently movable upwardly and downwardly ineffectively in openings formed in the strip by said equipment, a positive stop gage movable upwardly and downwardly through said openings and engageable with the material in said openings and at opposite sides of said line for determining the spaced relation of said openings, and means for rapidly ejecting the strip scrap resulting from the punching of the intended number of end closures from each strip and comprising upper and lower continuously rotating feed rollers, means for supporting one roller for movement toward and from the other, and means for moving said roller supporting means for causing the rollers to engage and feed strip scrap between them after completion of the punching operation upon each strip and while the gages are lowered and the punches and dies are separated.

PAUL E. PEARSON.
ALEXANDER A. TROMBLY.